Patented Mar. 6, 1923.

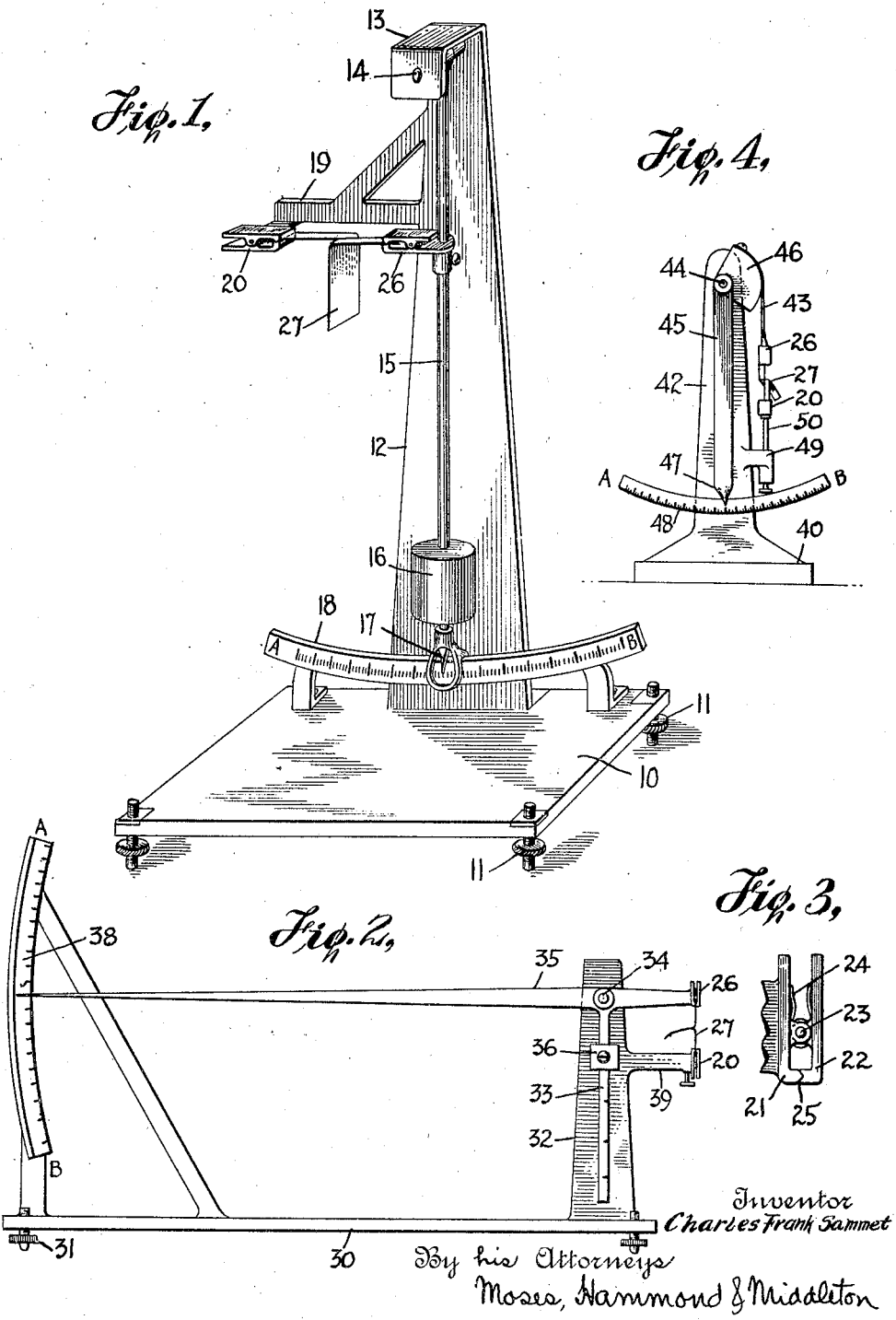

1,447,185

UNITED STATES PATENT OFFICE.

CHARLES FRANK SAMMET, OF DALTON, MASSACHUSETTS, ASSIGNOR TO PROCESS ENGINEERS, INCORPORATED, OF NEW YORK, N. Y., A CORPORATION OF NEW YORK.

PAPER TESTER.

Application filed May 17, 1920. Serial No. 381,852.

*To all whom it may concern:*

Be it known that I, CHARLES FRANK SAMMET, a citizen of the United States, residing at Dalton, in the county of Berkshire and State of Massachusetts, have invented certain new and useful Improvements in Paper Testers, of which the following is a specification.

This invention relates to measuring the tearing resistance of paper and its object is to devise a machine which is simple and inexpensive and yet one which can be depended upon to give accurate determinations, in grams, of the tearing resistance of any given piece of paper.

The invention consists of two elements adapted to hold the piece of paper to be tested, one of which elements moves as the paper is being torn, in relation to the other due to gravity, and the balance or component resulting from the pull of gravity and the resistance of the paper indicates on a scale, the amount of resistance in grams.

The invention is capable of a number of embodiments but I have illustrated the most desirable forms in the accompanying drawings in which:

Figure 1 is a perspective view of one form of my invention,

Figs. 2 and 4 are elevations of modifications, and

Fig. 3 is an elevation of a clip used to hold the paper being tested.

In the drawings the numeral 10 represents a base provided with leveling screws 11 carrying a standard 12, having its top portion 13 preferably bent over to support an axle 14 on which is pivotally mounted a swinging lever or pendulum 15 carrying a weight 16 adjustably mounted thereon. The lower end of the lever 15 carries a pointer mechanism 17 adapted to co-act with a curved scale 18 supported from the base 10.

The standard 12 has an arm or bracket 19 extending at right angles therefrom which is adapted to carry a clip or clamp 20 composed of two members 21 and 22 pivoted together at 23 and normally held in gripping position by means of a spring 24 and complementary gripping surfaces 25 are provided on the jaws of the clamp. A similar clip or clamp 26 is provided on the pendulum 15 so that the paper 27 to be tested is gripped between the clamps 20 and 26 as shown in Fig. 1.

In operation, the lever or pendulum is moved an appropriate distance toward A and then the paper held between the clamping members 6 and 7. Upon releasing the pendulum it will move under the influence of gravity toward the B end of the scale until the resistance offered by the tearing paper equals the pull of gravity. This resistance prevents the pendulum from swinging its full distance and when it finally comes to rest, the graduation can be read on the scale.

It will be noted that in all the modifications the two portions of the paper remain in the same plane during tearing, thus insuring equal tension throughout the operation.

In Fig. 2 a base 30 is provided having leveling means 31, a standard 32 a pivot 34 supported from the standard, a lever 35 pivoted thereon and provided with an adjustable weight 36 mounted upon an extension 33 of the lever. The lever 35 or pointer co-acts with a curved scale 38 suitably supported from the base 30. 39 indicates an arm extending at right angles from the standard 32 which is provided with a clip 20. The lever 35 extends beyond the pivot point 34 and carries on that extension a clip 26 which, with the clip 20, is adapted to hold the paper 27 to be tested therebetween.

The operation of this form of device is similar to that shown in Fig. 1. The point is raised to the A end of the scale, the paper attached to the clips and then the arm or lever released. The pivoted pointer or lever will travel over the scale until the tearing resistance equals the pull of gravity on the pointer or lever, and the scale is then read.

In the form shown in Fig. 4, 40 indicates a base, 42 a standard thereon, and 44 a pin extending from the standard 42 on which is pivoted a lever or pointer 45 having a weight 46 offset from the upper end of the pointer. 47 indicates an indicating point carried by the lever co-acting with a scale 48.

Secured to the weight 46 is a flexible element 43 adapted to carry a clip 26. 49 indicates an extension upon the standard 42 with an element 50 carrying a clip 20, and between the clips 20 and 26 is carried the paper 27 to be torn.

The operation of this form is identical with that shown in Fig. 2. The pointer is raised to the A end of the scale, the paper attached and the pointer or arm released. The pointer will travel over the scale until the tearing resistance equals the pull of gravity upon the pointer and the scale is then read.

The manner in which this resistance may be calculated and the scale made to read directly in grams is shown below:

W=weight of arm plus weight on it.
R=tearing resistance of paper.
X=scale reading at end of swing.
$W^x$ fall of center of gravity=$R^x$ length of tear. (Work done by machine.)

The fall of center of gravity of W is proportional to X.

The length of tear is proportional to scale subdivisions minus X.

Therefore $W^x$ $X^x$ constant=$R^x$ scale subdivisions minus $X^x$ constant from which R can be found and the scale graduated to show R directly in grams.

A method of carrying out this theory was as follows:

Definite weights were fastened to the short end of the lever arm representing various R's, the pointer raised to the A end of the scale, then released, and the position on the scale noted at which the pointer came to rest. This was repeated with various weights on a scale having 30 divisions, each division being subdivided into ten parts. The results were:

| Grams | 25 | 50 | 75 | 100 | 125 | 150 |
|---|---|---|---|---|---|---|
| Reading | 4.15 | 8.15 | 12.40 | 16.80 | 21.05 | 25.05 |

Each of the above readings was the average of five trials. From these results it was calculated that scale readings could be made equivalent to grams by multiplying by the factor 5.98. A scale was then made having divisions 5.98 times as large and the resistance read directly in grams from the scale.

It will thus be seen that I have devised a machine which will indicate the exact tearing resistance of a given piece of paper directly in grams. By the use of this device either the resistance of the fibrous tear lengthwise of the grain may be determined or by adjusting the weight to give greater tension, the resistance across the web may be indicated. A simple and inexpensive machine of this type is of great utility in the art especially when it can be depended upon for accurate determinations.

Obviously, various modifications other than those shown and described may be utilized to great advantage and on material other than paper without departing from the spirit of my invention.

What I claim is:

1. The method of testing the resistance to tearing of paper or the like, the steps of tearing a strip of paper by a pendulum-like mass falling from a predetermined height, diminishing the effect of the force acting on the mass through the angle of fall thereof by the resistance of the tearing paper until the mass comes to rest, balancing the tearing resistance of the paper, and then measuring the resistance to the mass offered by the paper.

2. The method of testing the resistance to tearing of paper or the like, which consists of tearing the paper by applying a tearing force at right angles to the paper, utilizing the paper resistance to retard and stop the effect of the force, and indicating the amount of resistance needed to stop the force.

3. The method of testing the resistance to tearing of paper or the like which consists in utilizing a pendulum-like mass of predetermined amount acting through an angle of fall by gravity, gradually diminishing the effect of the said force acting on the mass by the resistance offered by the tearing paper until the mass is brought to rest, this balanced condition being a measure of the tearing resistance of the paper.

4. The method of testing the resistance to tearing paper or the like, which consists in subjecting the paper to a variable and diminishing force, creating a complete balance between the resistance of the tearing of paper and the tendency of a gravity-operated instrument to tear the paper further.

5. The method of testing the resistance of tearing of paper or the like, which consists in beginning to tear the paper with a pendulum-like mass acting through gravity through an angle from an unbalanced condition, diminishing the effect of the said force on the mass gradually during its fall by the resistance offered by the tearing of paper, bringing said mass to rest when the tearing resistance of the paper balances the effect of the force on the mass, and indicating said balanced condition in grams of paper resistance.

6. A device for determining the tearing resistance of paper or the like, comprising a stand, a pendulum mounted thereon releasable from a predetermined height and acting through an angle of fall by the pull of gravity, means whereby the paper to be tested is held in operative position between said stand and said pendulum, said means resisting said pendulum through its angle of fall by the resistance offered by the tearing of paper, whereby the pendulum is brought to a state of rest and a balanced condition results between the paper resistance and gravity operating on the pendulum.

7. The apparatus of claim 6 with the addition of means for indicating said balanced condition marked in grams of paper resistance.

8. The method of testing the resistance of tearing of paper or the like, which consists of having an unbalanced pendulum-like mass act through an angle by gravity, and diminishing the effect of the said force during the fall of the mass by resistance offered by the tearing of the paper.

9. A method of testing the resistance of tearing of paper or the like which consists in having an unbalanced pendulum-like mass acting through an angle by gravity and being brought to a state of equilibrium by the resistance offered in the tearing of the paper.

10. The method of claim 9 with the additional step of measuring the work done by the force on the paper as designated on a scale by the difference between the angle of said swing and the full swing of said force were there no resistance thereto.

In testimony whereof I affix my signature.

CHARLES FRANK SAMMET.